Nov. 10, 1936.   D. W. EXNER   2,060,755
PROGRAM STARTING SYSTEM
Filed Jan. 30, 1936   2 Sheets-Sheet 1
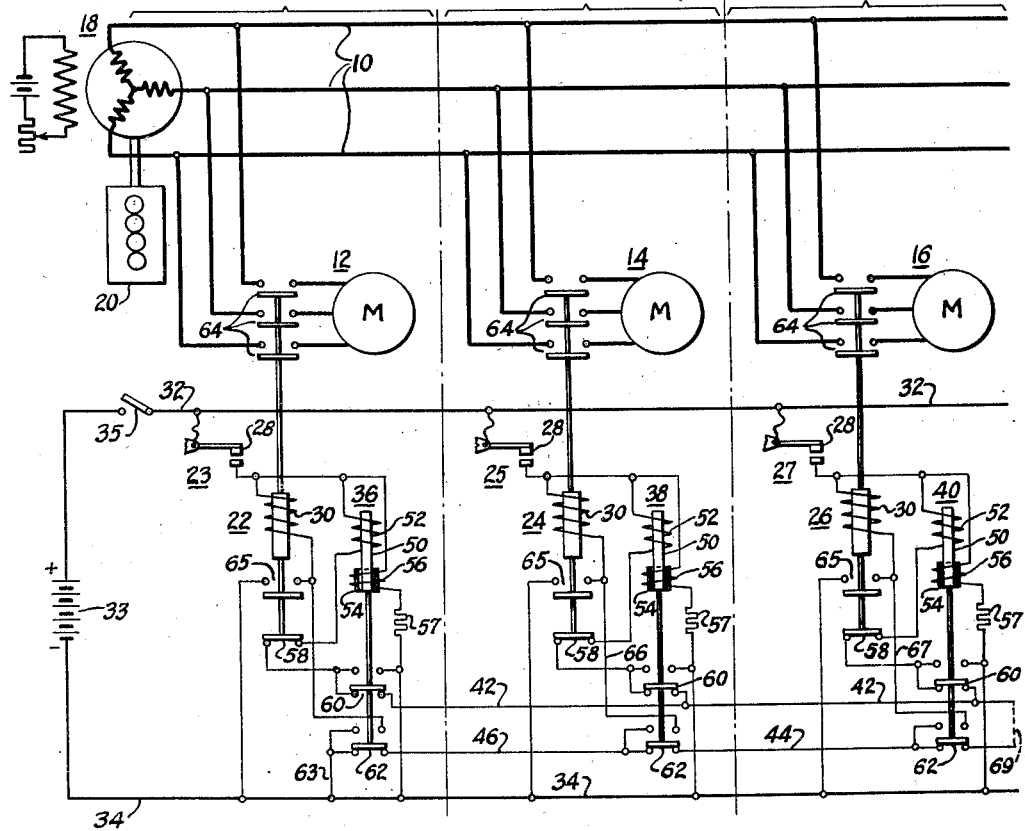
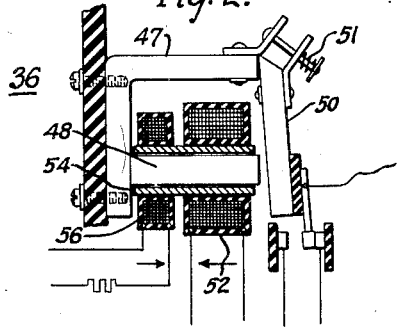
WITNESSES:
INVENTOR
Donald W. Exner.

Nov. 10, 1936.  D. W. EXNER  2,060,755
PROGRAM STARTING SYSTEM
Filed Jan. 30, 1936  2 Sheets-Sheet 2
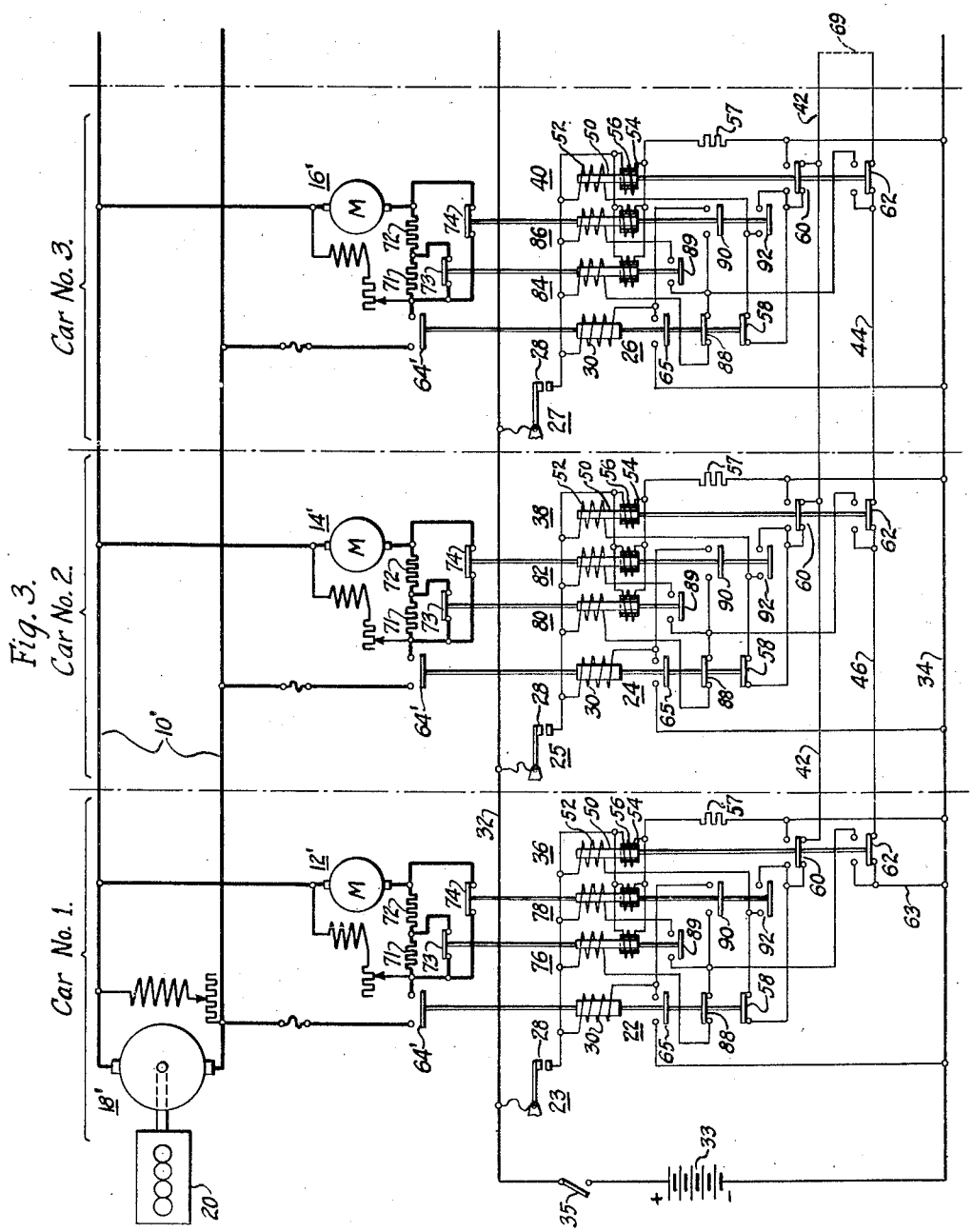

Patented Nov. 10, 1936

2,060,755

UNITED STATES PATENT OFFICE 2,060,755

PROGRAM-STARTING SYSTEM

Donald W. Exner, Forest Hills, Pa., assignor to Westinghouse Electric & Manufacturing Company, East Pittsburgh, Pa., a corporation of Pennsylvania Application January 30, 1936, Serial No. 61,526

8 Claims. (Cl. 172—239)

My invention relates to systems of control supervision and it has particular relation to systems which cause the starting of a plurality of power-consuming devices to proceed consecutively in accordance with a predetermined program.

Generally stated, the object of my invention is to provide an improved form of system for preventing the simultaneous starting of more than one of the several devices supervised.

Another object is to reduce the complexity, lower the cost, and improve the reliability of systems of this class.

An additional object is to provide a system of the above type which in train applications involving individual car compressor motors reduces the number of train-line conductors below that required by the sequence drum and other arrangements known to the prior art.

A further object is to accomplish the desired program starting of a plurality of power-consuming devices through the use of relatively inexpensive and highly reliable time-delay relay means.

In practicing my invention, I add to the starting control equipment of each of the motors or other power consuming devices a "sequence" relay of the time delay type, and I so interconnect the starting control circuits with these relays that at any given time only one of the motors can be initially energized. As this motor completes its starting cycle, the associated sequence relay permits another of the motors to be similarly brought into operation in a given order of preference determined by the named interconnections.

The feature that each of the several devices supervised must complete its starting cycle before an additional unit can be started enables the system of my invention to minimize the demands upon a power source of limited capacity which supplies a plurality of motors or other devices requiring more power to start than to maintain running. Diesel-electric powered trains involving one or more air-conditioning motors on each car constitute one application for which the system of my invention is of particular utility.

My invention itself, together with additional objects and advantages thereof, will best be understood through the following description of specific embodiments when taken in conjunction with the accompanying drawings, in which:

Figure 1 is a diagrammatic view of apparatus and circuits showing the program starting system of my invention applied to a plurality of electric motors supplied from a common source of alternating-current power;

Fig. 2 is a view, partially in section and partially in elevation, showing the mechanical arrangement of parts in one preferred form of sequence relay device used in the system of Fig. 1; and Fig. 3 is a diagrammatic representation of apparatus and circuits showing the program-starting system of my invention combined with the control circuits of a plurality of direct-current motors supplied, as in a Diesel-electric train application, from a common source of power.

While I have chosen to represent my improved program-starting system in association with certain railway train equipment, it will be understood that application is by no means so restricted. My system is, in fact, useful in any situation in which a common source of power of limited capacity supplies a plurality of devices requiring more power to start than to maintain running, and it may even be applied where the power-source capacity is not limited or where the devices are supplied from different sources.

The equipment shown in Fig. 1 is that found on any train each individual car of which is provided with air conditioning or other apparatus driven by an alternating-current motor. In the drawings, motors for three of the train cars are represented at 12, 14, and 16. The generator 18 which through circuit 10 supplies power to these motors is driven by a Diesel engine or other prime mover 20 of limited capacity and is represented as comprising a part of the equipment carried by No. 1 car.

In the represented application, each of the car motors is provided with a contactor, respectively shown at 22, 24 and 26 for motors 12, 14, and 16, which controls connection of the motor with the common supply circuit 10. Actuation of each of these contactors is in turn controlled by a thermostat or other device (23, 25, 27) adapted to initiate starting of the motor. To supply the necessary actuating current for these starting equipments, the train is provided with a control-source circuit, shown as comprising conductors 32 and 34, energized from a battery 33 or other suitable source of direct-current voltage.

Each of the car motors 12, 14, and 16 has the well-known characteristic of drawing considerably more current during its starting cycle than is required to maintain the motor running once it has been started. In the interests of limiting the demand for power upon the supply generator 18, it is, therefore, desirable to prevent more than one of the motors from being started at any given time. The program-starting system of my invention now to be explained accomplishes this result in an exceedingly simple, inexpensive, and reliable manner.

This system utilizes a sequence relay, shown at 36, 38, and 40 for the three named motors, associated with each of the motor control contactors 22, 24, and 26. These sequence relays are interconnected with each other by means of train conductors 42 and 44—46, which form a loop circuit to be more completely described, and which comprise the only additional interconnections between the cars which my new system occasions.

Each of the illustrated sequence relays is preferably of the well-known eddy-current time-delay type, one form of construction for which is more completely represented in Fig. 2. This construction utilizes a magnetic circuit which includes two interconnected stationary legs 47 and 48 and a movable armature 50 normally biased to the illustrated "back" position by means of a compression spring 51. The stationary core leg 48 carries the usual main control winding 52, a neutralizing winding 56 and a comparatively heavy cross-section single-turn conductor 54 which prevents rapid changes in the quantity of flux passed through the core.

The named windings, together with the contacts carried by the movable armature 50, are connected as shown in Fig. 1. Whenever the contacts 28 of the starting control device are closed, the neutralizing winding 56 of each relay receives energization from control source 32—34 through a circuit including a resistor 57. The main control winding 52 may simultaneously be energized if its circuit is at that time completed through auxiliary contacts 58 carried by the associated motor starting relay. In case of such completion, the armature 50 of the relay is caused to move the contact members carried thereby upwardly in Fig. 1 (and to the left in Fig. 2). The relative magnetizing effect of the main control winding 52 is much greater than that of the neutralizing or opposition-related winding 56.

Upon an interruption of the energizing circuit for the main control winding, the flux which it caused to flow through the relay magnetic circuit is prevented from immediately dying down by the eddy-current action of the enclosing ring 54. As a result, the armature 50 is held in the actuated position for some appreciable time, or until the gradual rate of reduction, aided by the neutralizing winding 56, lowers the flux to the drop-out value of the relay. By proper selection of the relative characteristics of the two windings and of the eddy-current loop, this time may be adjusted within a relatively wide range.

In the system of Fig. 1, the interconnections of the sequence relays and other portions of the illustrated program-starting system are such that preference of starting of the motors 12, 14, and 16 will be in the order of the position of the associated cars from the head end of the train. In considering the operation of this system, it will first be assumed a master control switch 35 is closed to energize circuit conductors 32 and 34 from direct-current power source 33.

Assume next that all three of the individual motor control devices 23, 25 and 27 close simultaneously. Without my improved system, all three of the motors 12, 14, and 16 would be simultaneously energized, and because of the heavy starting currents drawn, the main supply generator 18 would be seriously overloaded. With my system however, which first allows only motor 12 to start, then motor 14, and then motor 16, this objectionable overloading is prevented.

Under the conditions above assumed, the main control windings 52 of all three of the sequence relays 36, 38, and 40 are simultaneously energized. Each of these circuits extends from the positive control conductor 32 through the contact members 28 of the associated starting control device, the relay winding 52, contact members 58 of the associated main control contactor, contact members 60 of the sequence relay, conductor 42 (including section 69), a series connection of contact members 62 of the three sequence relays and conductor 63 back to the negative control conductor 34.

The three sequence relays 36, 38, and 40 all now move their contact members 60 and 62 upwardly. Relay 36 completes, by members 62, an actuating circuit for starting contactor 22. This circuit extends from positive control conductor 32 through the contacts 28 of control device 23, the actuating winding 30 of the contactor, contact members 62 of relay 36, and conductor 63 back to negative control conductor 34. In consequence, the motor starting contactor biases its contact members upwardly completing, through its main members 64, a connection of motor 12 with the power circuit 10 and establishing, through members 65, a holding-in circuit for the contactor.

Thus energized, motor 12 is brought up to speed, it being of the so-called line-start type which is adapted for direct connection with its energizing circuit. Motors 14 and 16, however, are not simultaneously energized for the reason that in moving upwardly contact members 62 of relay 36 interrupted the return loop circuit to the negative control conductor 34 through which energizing circuits, set up by the corresponding contact members of sequence relays 38 and 40, for the actuating windings of motor control contactors 24 and 26 must be completed, if at all. As long, therefore, as sequence relay 36 remains in the actuated position, motors 14 and 16 cannot start.

In moving to the actuated position, motor starting contactor 22 interrupted, by means of contact members 58, the circuit through which the main actuating winding 52 of sequence relay 36 was energized. Because of the before-explained delay characteristics of this relay, its armature 50 requires some time before moving to the "back" (Fig. 2) position, (downward in Fig. 1), the delay being sufficient to allow completion of the starting cycle of motor 12.

When contact members 60 and 62 of the sequence relay 36 do return to the illustrated downward position, member 62 completes an actuating circuit for starting contactor 24 associated with motor 14. This circuit extends from positive control conductor 32 through the contacts 28 of device 25, the winding 30 of the contactor, conductor 66, contact members 62 of sequence relay 38, conductor 46, contact members 62 of sequence relay 36 and conductor 63 back to negative control conductor 34.

Motor-starting contactor 24 accordingly moves all of its contact members upwardly, connecting, through members 64, motor 14 with the power circuit 10 and locking itself in through member 65. Hence, motor 14, also being of the line-start variety, comes up to speed in normal manner. In moving upwardly, contact members 58 of the starting contactor 24 interrupted the energizing circuit for the main actuating winding 52 of sequence relay 38, and after a time delay, during which the starting cycle of motor 14 completes itself, this sequence relay moves to the unactuated position completing, through contact members 62, an actuating circuit for the starting contactor 26 of motor 16.

This circuit extends from the positive control conductor 32 through control device 27, the actuating winding 30 of the contactor, conductor 67, contact members 62 of sequence relay 40, conductor 44, contact members 62 of sequence relay 38, conductor 46, contact members 62 of relay 36 and conductor 63 back to negative control conductor 34.

Starting contactor 26, accordingly, moves its contact members upwardly connecting, through members 64, the motor 16 with the power supply circuit 10 and locking itself in through members 65. In usual manner, motor 16 comes up to speed.

All three of the motors, 12, 14, and 16 have now been started consecutively in the order named, even though the original starting impulses occurred simultaneously, and the desired minimization of power demand has been effected by the illustrated system of my invention.

Operation of all three motors will continue until either the master control switch 35 is opened to shut down all of them or until one or more of the individual control devices 23, 25 or 27 separates its contacts 28. Such separation deenergizes the actuating circuit for the associated motor control contactor, allowing it to move its contact members 64 downwardly, and effects motor deenergization. This deenergization takes place in the same manner as were my program starting system not present.

In cases in which some of the motors are already running and two or more additional motors are simultaneously called into service by their automatic control devices, the system still operates to prevent simultaneous starting of more than one, it requiring that those next in preference wait until the starting cycle of the first selected had been completed. Thus, assuming in connection with Fig. 1 that motor 14 is already running, and starting impulses are transmitted to the control means for motors 12 and 16, motor 12 will first be started and then 16 will be brought into action, the operations being exactly the same as those just explained, except that the equipment for motor 14 is already in the running position when the starting of motor 12 is completed. In a similar manner, if motor 12 is already running, motor 14 will be started before motor 16, and if motor 16 is already running, motor 12 will be started before motor 14.

Although I have described my system in association with three power consuming devices, it is not restricted to this number, but may be applied wherever two or more devices are to be started in predetermined sequence. The system of Fig. 1 may be adapted to include only motors 12 and 14 merely by interconnecting conductor 42 with conductor 44 and eliminating the passage through the equipment associated with motor 16. In a similar manner, it may be extended to include additional motors merely by passing the loop circuit, of which conductor 42 forms a part, through each of the added units. This will include connection with the contact members 60 and 62 carried by the sequence relays associated with the added units in a manner which is a duplication of that shown for the units illustrated in Fig. 1. The loop circuit from conductor 42 is always closed beyond the last unit supervised, as indicated in Fig. 1, by the dotted section 69.

The described program-starting system of my invention is not restricted to any particular form of starting control equipment, and hence is as adaptable to direct-current supplied motors and other power consuming devices as to those of the alternating-current line-start variety illustrated in Fig. 1. One such further application is shown in Fig. 3.

In this application, the three motors 12', 14', and 16' are adapted to receive energization from a common power circuit 10' which is supplied by a direct-current generator 18' shown as being driven by a Diesel engine or other prime mover 20 of limited capacity. In addition to the main starting control contactors 22, 24, and 26 associated with these three motors, each has included in its main energizing circuit a pair of resistors 71 and 72 which are adapted to be short circuited by a pair of contact members 73 and 74 respectively carried by two accelerating relays.

The accelerating relays associated with motor 12' are represented at 76 and 78; those with motor 14' at 80 and 82; and those with motor 16' at 84 and 86. Each of these relays is represented as being of the eddy-current time-delay type shown in Fig. 2 and utilized as sequence devices in the program-starting system of Fig. 1. These sequence relays 36, 38 and 40 are duplicated in the system of Fig. 3.

The system of motor starting shown in Fig. 3 is so arranged that in the case of motor 12', for example, when the contacts 28 of the starting control device 23 are closed, both of the accelerating relays 76 and 78 move their contacts 73 and 74 upwardly thus removing the short circuits from the current-reducing resistors 71 and 72. The main control contactor 22 then actuates its contact members 64' upwardly effecting a connection of the motor with the power cicruit 10' through the two resistors 71 and 72. After a given time delay, relay 76 returns its contact members 73 to the downward position shown, thereby removing one of the resistor sections from the circuit. A short time later the relay 78 similarly shorts out the remaining resistor section and connects the motor directly across the power circuit 10'. The described arrangement of automatic acceleration is of itself old in the art.

When the program-starting system of my invention is combined therewith in the manner shown in Fig. 3, the operation is basically the same as that explained in connection with Fig. 1, except that the two accelerating relays operate between the time that the sequence device actuates and the main starting contactor picks up.

Specifically, assume that in the system of Fig. 3 the master control switch 35 is closed and all three of the starting devices 23, 25 and 27 simultaneously close their contact members 28. As in the case of Fig. 1, the illustrated system is so arranged that motor 12' will be started first, then motor 14', and last motor 16'.

As a result of the engagement of contact members 28, all three of the sequence relays 36, 38, and 40 move their contact members upwardly to the actuated position. Accelerating relays 76, 80, and 84 then also actuate in response to winding energizations completed through contact members 88 of main starting contactors 22, 24, and 26. Accelerating relays 78, 82, and 86 next actuate in response to main winding energizations completed by contact members 89 of accelerating relays 76, 80, and 84.

In moving to their actuated positions, sequence relays 78 and 36 complete, through contact members 90 and 62, an energizing circuit for the actuating winding 30 of the main control contactor 22 associated with motor 12'. At the same time, contact members 62 of relay 36 interrupted the connection between conductors 46 and 63 and thereby opened the corresponding energizing circuits for the main starting contactors 24 and 26 associated with motors 14' and 16'.

In moving to its actuated position, contactor 22 completes through contact members 64' the main energizing circuit for motor 12' and causes current to be passed to the motor from circuit 10' through resistors 71 and 72. In moving upwardly, contact members 88 of contactor 22 interrupted the main winding energizing circuit for accelerating relay 76, and after a time delay this relay moves its contact members 73 downwardly short circuiting one of the named resistor sections. In so doing, contact members 89 open the main winding energizing circuit for relay 78 causing it, after a time delay, similarly to move its contact members down and short circuit the remaining resistor section from the motor energizing circuit. In so doing, it interrupts, through contact members 92, the main winding energizing circuit for sequence relay 36.

After a time delay, this relay moves to the unactuated position completing, through contact members 62, starting control energizing circuits for motor 14'. This motor then starts up in a manner exactly similar to that described in connection with that of motor 12'. The starting cycle having been completed, sequence relay 38 associated with it moves its contact members downwardly completing, through members 62, starting control circuits for motor 16'.

This motor is then started in the same manner. At the completion of its starting cycle, sequence relay 40 associated with its contacts moves to the illustrated downward position. All three of the motors are now on the line and may be individually stopped in any order desired by the opening of contact members 28 of their associated control devices.

As indicated in connection with the system of Fig. 1, if one or more of the motors is originally running and two or more additional ones simultaneously receive starting impulses, these will be started consecutively in a preference determined by the original predetermined schedule.

The fundamental circuits of Fig. 1 being the same as those of Fig. 3, it is equally adaptable to any number of motors or other power consuming devices desired.

Because of its simplicity, high reliability, and wide range of application, my new program-starting system hereinbefore described is one of marked commercial utility. As applied to multi-car train applications, it is of particular advantage in reducing to but a single pair the number of train conductors required to effect the desired sequence starting, which makes use of standard equipment throughout.

While I have shown and described certain specific embodiments of my invention, I am fully aware that many further modifications thereof are possible. My invention, therefore, is not to be restricted except insofar as is necessitated by the prior art and by the scope of the appended claims.

I claim as my invention:

1. In a system comprising a plurality of power-consuming devices individually requiring more power to start than to maintain running and each of which has associated therewith a starting contactor and actuation-control means therefor, the combination of means for minimizing power demands by preventing the simultaneous starting of more than one of said devices comprising a relay responsive to the control means for each contactor, each of said relays being adapted to set up an actuating circuit for the associated contactor and to delayedly release itself after that contactor actuates, and a loop circuit so interconnecting said relays that at any given time they allow initial completion of the actuating circuit for but one of said contactors only.

2. In a system comprising a plurality of power-consuming devices each of which has associated therewith a starting contactor and actuation-control means therefor, the combination of means for preventing the simultaneous starting of more than one of said devices comprising a relay responsive to the control means for each contactor, each of said relays being adapted to set up an actuating circuit for the associated contactor and to delayedly release itself after that contactor actuates, and a loop circuit so interconnecting said relays that at any given time they allow initial completion of the actuating circuit for but one of said contactors only and require a release of the relay sensitive to the resulting contactor actuation before another of said contactor-actuating circuits can be completed.

3. A system for causing a plurality of power-consuming devices, with each of which is associated a starting contactor and actuation-control means therefor, always to be started consecutively in a given relative order comprising a relay responsive to the control means for each device, each of said relays being adapted to set up an actuating circuit for the associated contactor and delayedly to release itself upon actuation of this contactor, and an interconnecting loop circuit for said relays which allows at any given time initial completion of the actuating circuit for but one of said contactors only.

4. A system for causing a plurality of power-consuming devices, with each of which is associated a starting contactor and actuation-control means therefor, always to be started consecutively in a given relative order comprising a relay responsive to the control means for each device, each of said relays being adapted to set up an actuating circuit for the associated contactor and delayedly to release itself upon actuation of this contactor, and an interconnecting loop circuit for said relays which allows at any given time initial completion of the actuating circuit for but one of said contactors only and makes initial completion of that for another dependent upon a release of the relay which is sensitive to the contactor actuation first effected.

5. A system for causing a plurality of power-consuming devices, with each of which is associated a starting contactor and actuation-control means therefor, always to be started consecutively in a given relative order comprising a relay responsive to the control means for each device, each of said relays being adapted to set up an actuating circuit for the associated contactor and delayedly to release itself upon actuation of this contactor, and a loop circuit so interconnecting said relays that at any given time they allow initial completion of the actuating circuit for but one of said contactors only and require a release of the relay sensitive to the resulting contactor actuation before another of said contactor-actuating circuits can be completed.

6. In combination with a plurality of power-consuming devices with each of which is associated a starting contactor and actuation-control means therefor, a system for causing said devices always to be started consecutively in a given relative order comprising a relay responsive to the control means for each device, each of said relays being adapted to set up an actuating circuit for the associated contactor and delayedly to release itself upon actuation of this contactor, and a loop circuit so interconnecting said relays that actuation of each relay opens the actuating circuits of the starting contactors for all unstarted devices which follow in the given relative starting order above referred to the device with which that relay is associated.

7. In a system comprising a plurality of power-consuming devices individually requiring more power to start than to maintain running and each of which has starting initiation and energization control means associated therewith, the combination of means for minimizing power demands by preventing the simultaneous starting of more than one of said devices comprising a relay, responsive to the starting initiation means for each, which is adapted to set up a circuit permitting actuation of the associated energization control means and which delayedly releases itself after such actuation, and a loop circuit so interconnecting said relays that at any given time they allow initial completion of but one of said actuation-permitting circuits.

8. A system for causing a plurality of power-consuming devices, with each of which is associated a starting-initiation means and an energization-control means, always to be started consecutively in a given relative order comprising a relay responsive to the starting-initiation means for each device, each of said relays being adapted to set up a circuit which permits actuation of the associated energization-control means and delayedly to release itself upon such actuation, and an interconnecting loop circuit for said relays which allows at any given time initial completion of but one of said actuation-permitting circuits.

DONALD W. EXNER.